C. B. CROFFORD.
TEA AND COFFEE MAKER.
APPLICATION FILED JAN. 31, 1911.

1,000,326.

Patented Aug. 8, 1911.

Inventor
C. B. Crofford.

Witnesses

By

Attorney

COLUMBIA PLANOGRAPH CO., WASHINGTON, D. C.

UNITED STATES PATENT OFFICE.

CHARLES B. CROFFORD, OF MEMPHIS, TENNESSEE, ASSIGNOR OF ONE-HALF TO CLARENCE NELSON, OF MEMPHIS, TENNESSEE.

TEA AND COFFEE MAKER.

1,000,326.   Specification of Letters Patent.   Patented Aug. 8, 1911.

Application filed January 31, 1911. Serial No. 605,709.

*To all whom it may concern:*

Be it known that I, CHARLES B. CROFFORD, a citizen of the United States, residing at Memphis, in the county of Shelby and State of Tennessee, have invented certain new and useful Improvements in Tea and Coffee Makers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in coffee and tea makers and consists of various details of construction and combinations and arrangements of parts which will be hereinafter fully described and then specifically defined in the appended claim.

I illustrate my invention in the accompanying drawings, in which:—

Figure 1:
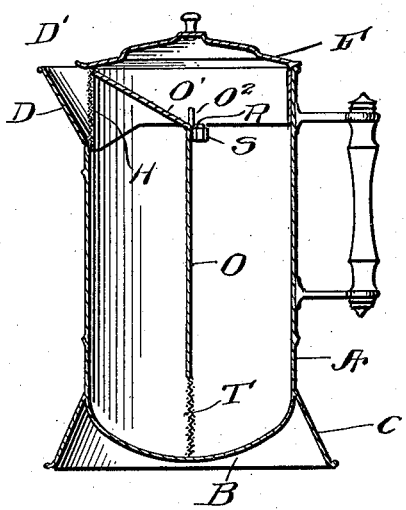
Figure 2:
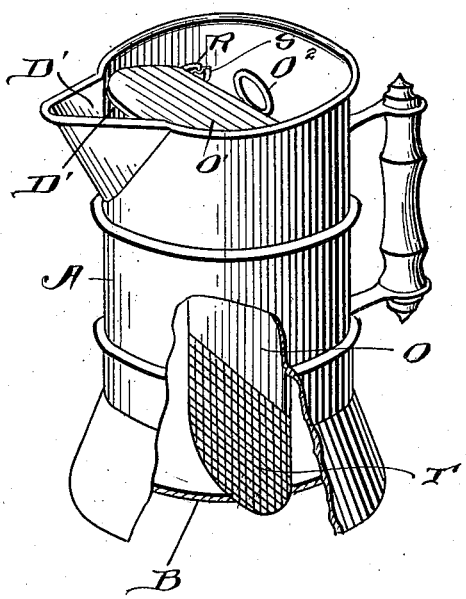
Figure 3:
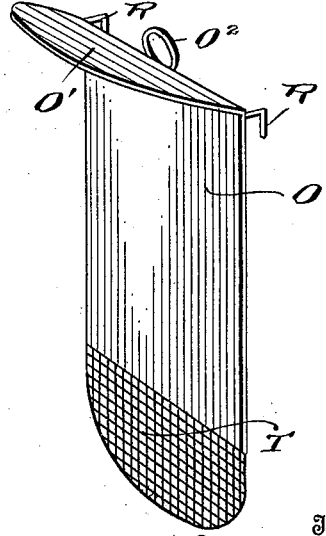

Figure 1 is a vertical sectional view through a coffee and tea pot made in accordance with my invention. Fig. 2 is a perspective view, a part being broken away to better illustrate details of the invention, and Fig. 3 is an enlarged detail perspective view showing a slide partition.

Reference now being had to the details of the drawings by letter. A designates the body portion of the coffee pot having a concaved bottom B and a conical-shaped flange C is fastened to said body portion and extends a slight distance below the concaved bottom. The body portion is provided with a spout D with an exit opening D', and F designates a flanged cover, the flange of which telescopes within the body portion and is adapted to normally close the spout or exit opening. A screen H is mounted over an opening in the flange and affords means whereby, when it is desired to pour liquid from the pot, the cover may be turned so that the opening in the flange will register with the exit opening in the pouring spout.

A slide partition O divides the body portion of the pot into two compartments and its upper end is laterally bent as at O' and is provided with a handle $O^2$. Pins R project from said laterally projecting portion and are adapted to engage the eyes S fastened to the inner surface of the body portion. A strainer T is fastened to the lower end of the slide partition and affords means for retaining the grounds.

From the foregoing, it will be noted that, by the provision of a coffee pot made in accordance with my invention, the grounds are held toward the rear of the body portion and, when it is desired to dispense liquid from the body portion, it may be done by turning the top handle to cause the openings to register, thereby allowing the liquid, after being strained, to be poured out.

What I claim to be new is:—

A coffee pot having a cylindrical body portion with a strainer at the opening into the spout thereof, the bottom of the body portion being concaved, eyes fixed to the inner surface of the pot at points diametrically opposite, a partition with laterally extending angled hooks engaging said eyes, the upper portion of said partition being bent at an angle which is provided with a rounded edge conforming to the cylindrical wall of said body portion and overhanging the upper edge of said strainer, a screen fixed to the bottom of the partition and having a convexed end conforming to and engaging the concaved bottom of the pot.

In testimony whereof I hereunto affix my signature in the presence of two witnesses.

CHARLES B. CROFFORD.

Witnesses:
C. NELSON,
A. HANNA.

Copies of this patent may be obtained for five cents each, by addressing the "Commissioner of Patents, Washington, D. C."